(No Model.) 2 Sheets—Sheet 1.
C. W. WOOD.
GUANO DISTRIBUTER AND SEED PLANTER.
No. 465,081. Patented Dec. 15, 1891.
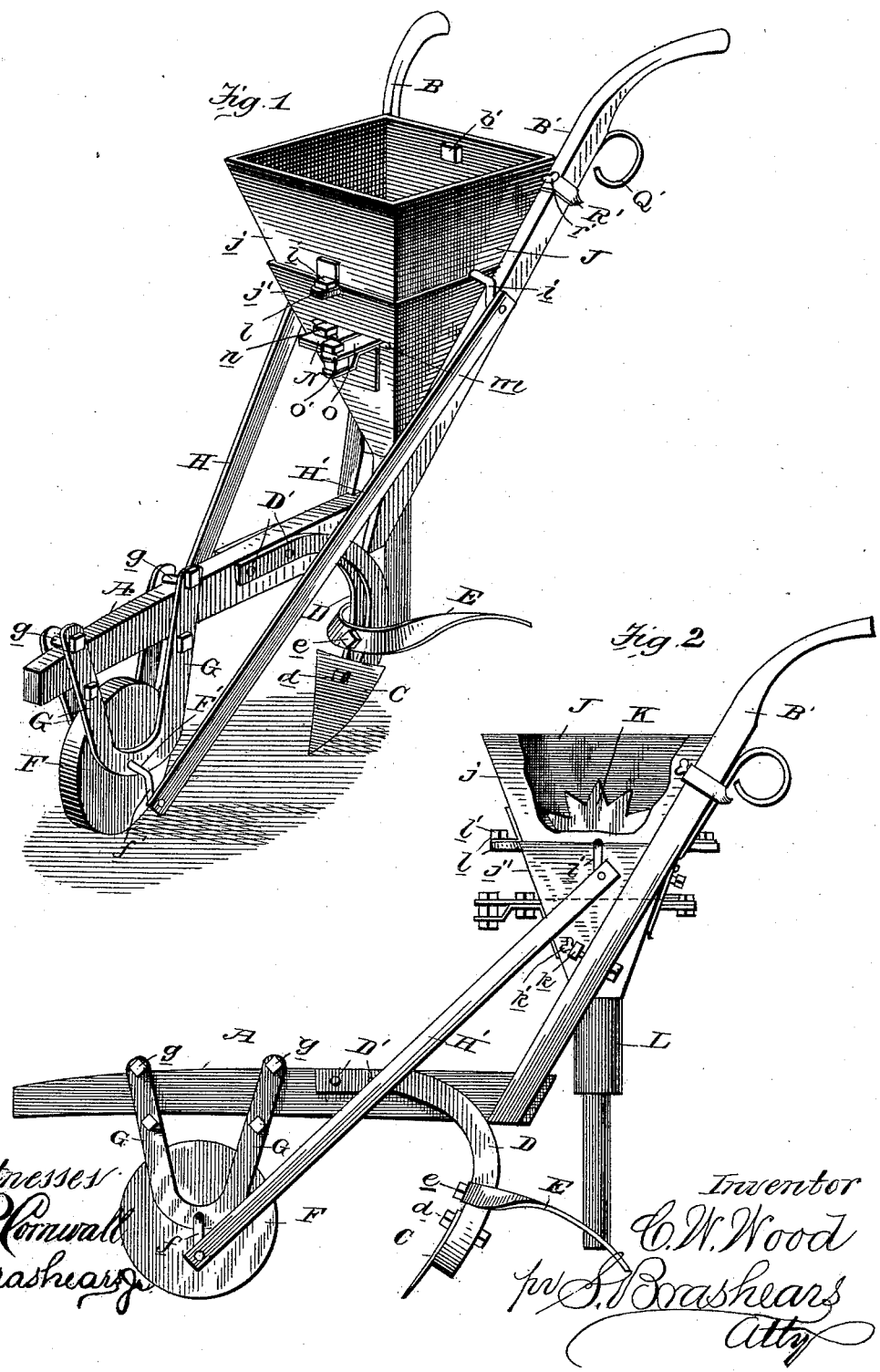

(No Model.) 2 Sheets—Sheet 2.
C. W. WOOD.
GUANO DISTRIBUTER AND SEED PLANTER.
No. 465,081. Patented Dec. 15, 1891.
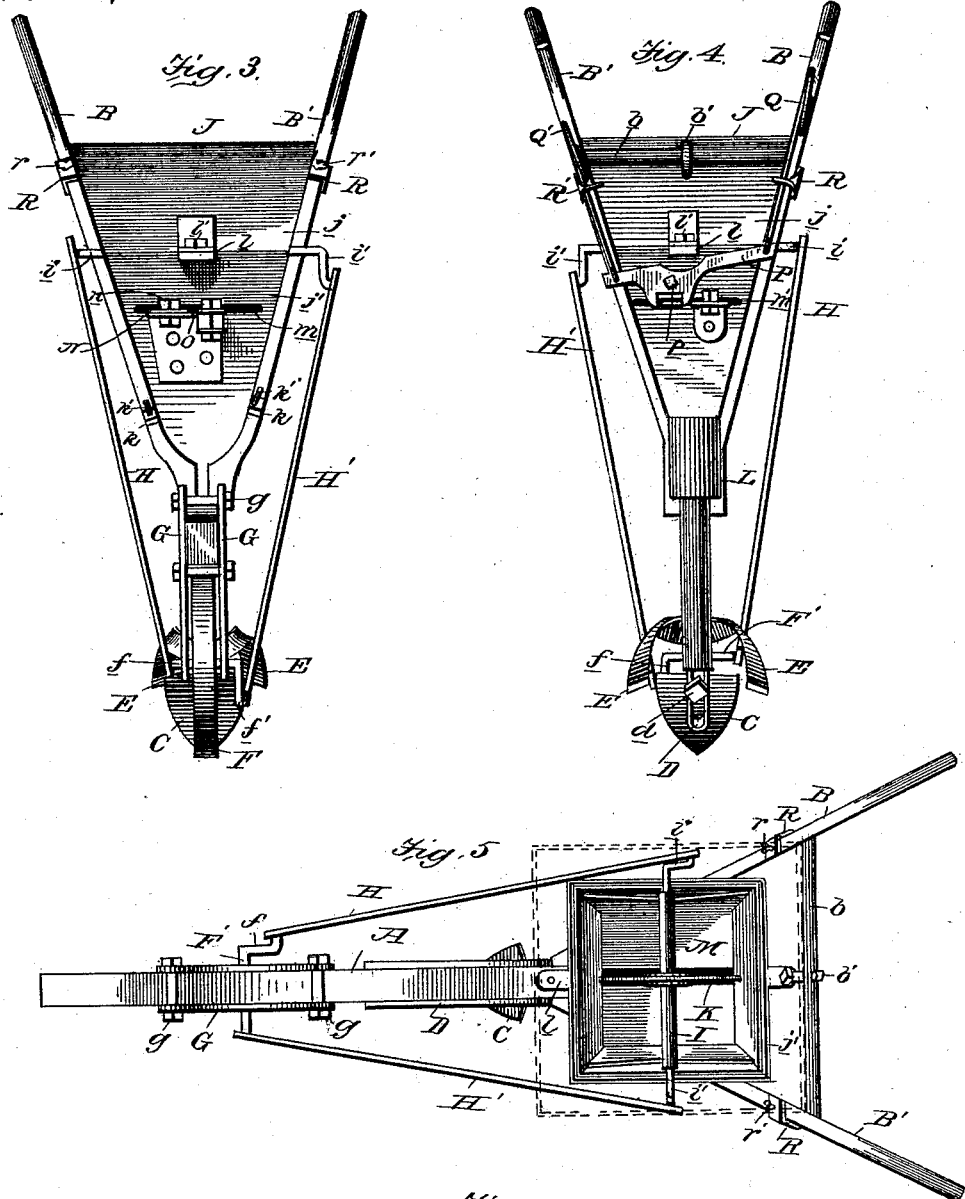

UNITED STATES PATENT OFFICE.

CHARLES W. WOOD, OF OTHER, GEORGIA.

GUANO-DISTRIBUTER AND SEED-PLANTER.

SPECIFICATION forming part of Letters Patent No. 465,081, dated December 15, 1891.

Application filed April 9, 1891. Serial No. 388,288. (No model.)

*To all whom it may concern:*

Be it known that I, CHARLES W. WOOD, a citizen of the United States, residing at Other, in the county of Paulding and State of Georgia, have invented certain new and useful Improvements in Guano-Distributers and Seed-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is in the nature of a guano-distributer or seed-planter, and has for its object to furnish such an implement of an improved construction, which can be applied to an ordinary plow or cultivator or removed therefrom at will.

With this object in view my invention consists in the improved construction, arrangement, and combination of parts hereinafter described, and afterward specifically pointed out in the claims.

In the drawings, Figure 1 is a perspective view of an implement embodying my invention. Fig. 2 is a view in side elevation of the same part of the hopper being broken away. Fig. 3 is a view in front elevation of the same. Fig. 4 is a view in rear elevation of the same. Fig. 5 is a top plan view of the same, the hopper being omitted and its outline shown in dotted lines. Fig. 6 is a horizontal section through the hopper just above its bottom, the stirring-wheel being omitted.

Like letters of reference mark the same parts wherever they occur in the various figures of the drawings.

Referring to the drawings by letters, A is the beam, and B B' the handles, of an ordinary plow or cultivator, such parts being secured together, as usual.

C is the share or shovel.

D is the support for the shovel, consisting of a bent bar secured to each side of the beam A by means of bolts D' D'. The shovel is clamped adjustably to this support by a bolt $d$, passing between the two parts of the bent bar D, the shovel being thus capable of adjustment longitudinally of the bent bar.

E E are covering-arms made of a single bent piece of metal extending rearward from bar D and secured adjustably thereto by a bolt $e$ in substantially the same manner as the bolt $d$ secures the shovel, the covering-arms being bent downward in the rear of the shovel. The coverers are thereby adjustable in height on bar D.

F is a supporting or guide wheel located in front of the shovel and below the beam. It is mounted on a shaft F', having at each end a crank, as $f\ f'$, said shaft having its journals in the lower end of the two U-shaped hangers G G, these hangers being removably secured to and longitudinally adjustable upon the beam A by bolts $g$. Upon each of these cranks $f\ f'$ are pivotally connected rods or pitmen H H', having similar connections at their opposite ends with cranks $i\ i'$ on the ends of a shaft I, journaled in the sides of a hopper J and carrying a stirring-wheel K, located in said hopper and projecting down through a slot in the bottom thereof.

The hopper J is composed of two parts or sections $j\ j'$, one above the other, and the shaft I is journaled between these sections, so as to be easily removable by taking the section $j$ off the section $j'$. The lower section $j'$ has projecting from its sides lugs $k\ k$, which embrace the handles B B', and through one of these lugs a set-screw $k'$ passes, and, abutting against the handles, secures the section $j'$ of the hopper adjustably to said handles. The sections of the hopper where they come together are provided with lugs $l\ l$, in which are bolts or screws $l'$ to hold the sections together.

The seed or guano is placed in the top of the hopper, and passes for distribution out of a tube L, forming the lower end or continuation of the hopper, the quantity passing out being regulated, as hereinafter described. The lower section $j'$ is slotted horizontally in front and rear at $m\ m'$, and just above these slots is a slotted bottom M. In the slots $m\ m'$, just below the bottom M, are two plates N O, the first being rigidly but adjustably secured by bolts $n$, passing through slots $n'$ in said plate N. The plate O is pivoted at O', and is movable toward or from plate N to open or close up the space between them by a forked plate P, which embraces the rear end of this plate. This plate P is pivoted at $p$ to the hopper, and at opposite sides of its pivot is connected to rods Q Q', working in clampways R R' under the handles B B'. On the upper ends of these rods are rings in which the fingers can be inserted to pull either rod, as desired, to open or close the slot in the bottom of the hopper, as may be desired. The clampways are adjustably secured to the handles by set-screws $r\, r'$. The upper section $j$ of the hopper is secured to the cross-bar $b$ of the handles by a hook-bolt $b'$, as shown, the hook embracing the cross-bar and the nut being inside the hopper.

The delivery-tube may be of metal or rubber, as desired, dependent upon the point at which the contents are to be delivered. The rubber tube will be specially valuable in rough stony ground, as it will give and bend, thus passing over an obstruction without breaking, and may be bent forward to place the guano just where it may be wanted.

In operating the device the wheel will be rotated in passing over the ground, and this rotation will be communicated to the stirrer-wheel through the medium of the cranks and connecting-rods, the cranks being so placed that there can be no dead-centers. The stirrer-wheel is therefore kept rotating as long as the machine is drawn along, thus preventing the slot in the bottom of the hopper from being choked up and always insuring the distribution of a proper proportion of the guano or seed.

By operating the finger-pulls the slot in the bottom of the hopper may be partially closed to decrease the amount of material distributed, or may be wholly closed when stopping, turning, or moving from one point to another.

The whole distributing mechanism may be attached to any ordinary plow or cultivator or removed readily therefrom at will, thus making two implements of one and rendering it unnecessary to provide great space for storage.

Having thus fully described my invention, what I claim as new, and desire to secure by Letters Patent of the United States, is—

1. In combination, the handles and their cross-bar, the hopper in two sections bolted together, the clamps for adjustably securing the lower section to the handles, and the hook-bolt for securing the upper section to the cross-bar, as set forth.

2. In combination with the plow-beam, the removable and adjustable hangers G, the wheel F, its shaft F', journaled in said hangers and having cranks $f f'$ at its ends, the handles secured to the beam, the hopper made in two sections $j j'$, bolted together and independently and adjustably secured to the handles, the shaft I, journaled between these sections, provided with cranks $i i'$ at its ends, the stirrer-wheel on said shaft I, and the bars H H', connecting the cranks $f f'$ and $i i'$, as and for the purpose set forth.

3. In combination, the hopper having a slotted bottom, a plate secured under the bottom at one side of the slot and adjustable to narrow the opening, a second plate pivoted to the bottom on the opposite side of the slot to temporarily close or narrow the opening, the forked bar pivoted to the side of the hopper, embracing the end of the pivoted bar and having ends extending sidewise to the handles, and finger-pulls engaging said ends of the forked bar and arranged to slide under the handles, as set forth.

4. In combination with the plow-beam, the bent bar having its upper ends bolted to opposite sides of the beam, the shovel adjustably secured to the front of the bar by a bolt passing through the slot formed by the two sides of the bent bar, and the coverers consisting of a single bent and twisted bar resting upon and adjustably secured to the front of the two parts of the bent bar by means of a bolt passing between said parts, as set forth.

CHARLES W. WOOD.

In presence of—
W. H. SPEER,
DAVID F. PEARCE.